United States Patent
Li

(10) Patent No.: US 6,864,420 B2
(45) Date of Patent: Mar. 8, 2005

(54) SERIAL BUS CLADDING STRUCTURE

(76) Inventor: Wen-Yu Li, 4F, No. 5, Alley 6, Lane 222, Tun Hua N. Rd., Taipei (TW)

( * ) Notice: Subject to any disclaimer, the term of this patent is extended or adjusted under 35 U.S.C. 154(b) by 0 days.

(21) Appl. No.: 10/764,936

(22) Filed: Jan. 26, 2004

(65) Prior Publication Data

US 2004/0154825 A1 Aug. 12, 2004

(30) Foreign Application Priority Data

Mar. 12, 2003 (TW) .................................. 92203801 U

(51) Int. Cl.⁷ ............................................... H01B 11/06
(52) U.S. Cl. ................... 174/36; 174/106 R; 174/117 F
(58) Field of Search ............................... 174/117 F, 36, 174/106 R, 110 A

(56) References Cited

U.S. PATENT DOCUMENTS

| | | | | |
|---|---|---|---|---|
| 4,751,614 A | * | 6/1988 | Mehnert | 361/437 |
| 4,835,394 A | * | 5/1989 | Steele | 250/385.1 |
| 4,973,794 A | * | 11/1990 | Steele | 174/36 |

\* cited by examiner

*Primary Examiner*—Chau N. Nguyen
(74) *Attorney, Agent, or Firm*—Alan D. Kamrath; Nikolai & Mersereau, P.A.

(57) ABSTRACT

A cladding structure includes a plurality of serial buses, an insulating covering layer surrounding the serial buses, a metallic plating layer mounted on the covering layer, and a metallic protective layer mounted on the plating layer. Thus, the cladding structure can prevent an electromagnetic interference efficiently. In addition, the cladding structure has a steady signal transmission.

16 Claims, 1 Drawing Sheet

SERIAL BUS CLADDING STRUCTURE

BACKGROUND OF THE INVENTION

1. Field of the Invention

The present invention relates to a cladding structure, and more particularly to a serial bus cladding structure that can efficiently prevent an electromagnetic interference.

2. Description of the Related Art

A conventional serial bus structure in accordance with the prior art shown in FIG. 3 comprises a plurality of serial buses 10, two metallic covering layers 20 respectively mounted on upper and lower end faces of the serial buses 10, and a glue layer 30 mounted between the serial buses 10 and the covering layers 20.

However, the glue layer 30 is melted at a higher temperature, so that the glue layer 30 easily leaks outward, thereby decreasing the sealing effect, so that the conventional serial bus structure is interrupted by an electromagnetic interference. In addition, it is necessary to bond the covering layers 20 on the serial buses 10, thereby increasing the working time and costs of fabrication. Further, the covering layers 20 decrease flexibility of the serial buses 10. Further, the covering layers 20 have different thickness, thereby producing uneven impedance, so that the conventional serial bus structure cannot prevent an electromagnetic interference efficiently. Further, the glue layer 30 is made of non-transparent material, so that the arrangement of the serial buses 10 is not visible from the covering layers 20, so that the pitch between the serial buses 10 cannot be adjusted to be kept at a constant value, thereby decreasing the transmission effect of the serial buses 10.

SUMMARY OF THE INVENTION

The primary objective of the present invention is to provide a cladding structure that can prevent an electromagnetic interference efficiently.

Another objective of the present invention is to provide a cladding structure that has a rigid and stable construction.

A further objective of the present invention is to provide a cladding structure that has a steady signal transmission.

A further objective of the present invention is to provide a cladding structure that has an insulating surface layer mounted on the protective layer to prevent a short circuit and to increase the lifetime of the cladding structure.

A further objective of the present invention is to provide a cladding structure, wherein the covering layer is made transparent, so that arrangement of the serial buses is visible from the covering layer to facilitate adjustment of the serial buses, so that the pitch between the serial buses is adjusted to be kept at a constant value to maintain a steady signal transmission effect.

In accordance with the present invention, there is provided a cladding structure, comprising a plurality of serial buses, an insulating covering layer surrounding the serial buses, a metallic plating layer mounted on the covering layer, and a metallic protective layer mounted on the plating layer, wherein:

each of the serial buses includes a co-axial cable;
the covering layer surrounds an outer side of the serial buses to form an insulating layer to protect the serial buses;
the plating layer is attached on a surface of the covering layer; and
the protective layer is attached on a surface of the plating layer.

Further benefits and advantages of the present invention will become apparent after a careful reading of the detailed description with appropriate reference to the accompanying drawings.

DETAILED DESCRIPTION OF THE INVENTION

Figure 1:
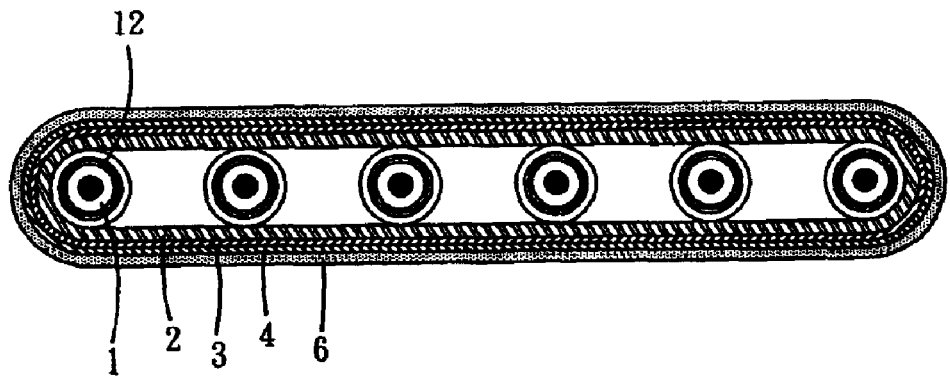
FIG. 1 is a plan cross-sectional view of a cladding structure in accordance with the preferred embodiment of the present invention.

Referring to the drawings and initially to FIG. 1, a serial bus cladding structure in accordance with the preferred embodiment of the present invention comprises a plurality of serial buses 1, an insulating covering layer 2 surrounding the serial buses 1, a metallic plating layer 3 mounted on the covering layer 2, a metallic protective layer 4 mounted on the plating layer 3, and an insulating surface layer 6 mounted on the protective layer 4.

The serial buses 1 are equally spaced from each other. Each of the serial buses 1 includes a co-axial cable 12 to connect different circuit boards and to transmit the signals of the circuit boards. Each of the serial buses 1 includes FFC, FPC and FCC.

The covering layer 2 is preferably made of a heat-resistant material, such as Mylar, PVC, PU or the like, surrounding an outer side of the serial buses 1 to form an insulating layer to protect the serial buses 1. In addition, the Mylar material is made transparent, so that the arrangement of the serial buses 1 is visible from the covering layer 2 so as to facilitate adjustment of the serial buses 1, so that the pitch between the serial buses 1 is kept at a constant value to maintain a steady transmission impedance.

The plating layer 3 is preferably made of a metallic material, such as a copper or the like, that can prevent an electromagnetic interference (EMI) efficiently. The plating layer 3 is attached on a surface of the covering layer 2 in a sputter plating manner. In addition, the plating layer 3 has a portion connected to the ground to conduct the charges of the electromagnetic waves, so that the surface of the covering layer 2 forms an EMI isolation efficiently.

The protective layer 4 is preferably made of a wear-resistant and anti-oxidant metallic material, such as a stainless steel or the like. The protective layer 4 is attached on a surface of the plating layer 3 in a sputter plating manner to enhance the wear-resistant and anti-oxidant strength of the surface of the plating layer 3.

The surface layer 6 is preferably made of an insulating material, such as a rubber or the like, surrounding a surface of the protective layer 4 without detachment.

Accordingly, the cladding structure can prevent an electromagnetic interference efficiently. In addition, the cladding structure has a steady signal transmission. Further, the cladding structure has an insulating surface layer 6 mounted on the protective layer 4 to prevent a short circuit and so as to increase the lifetime of the cladding structure. Further, the covering layer 2 is made transparent, so that arrangement of the serial buses 1 is visible from the covering layer 2 to facilitate adjustment of the serial buses 1, so that the pitch between the serial buses 1 is adjusted to be kept at a constant value to maintain a steady signal transmission effect.

Figure 2:
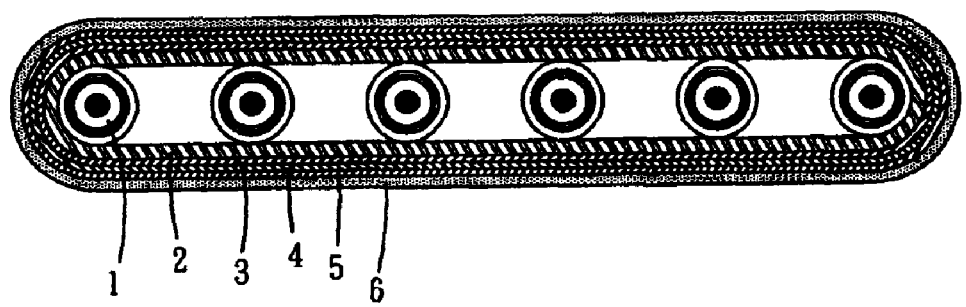
FIG. 2 is a plan cross-sectional view of a cladding structure in accordance with another embodiment of the present invention.
Figure 3:
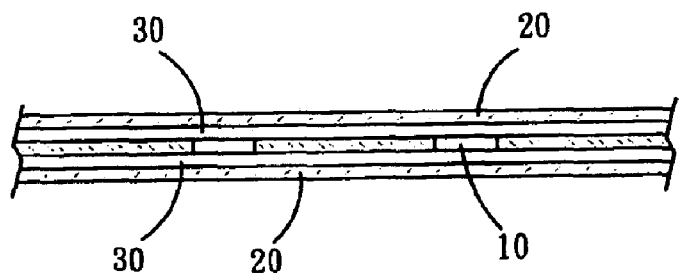
FIG. 3 is a partially cut-away plan cross-sectional view of a conventional structure in accordance with the prior art.

Referring to FIG. 2, a serial bus cladding structure in accordance with another embodiment of the present invention further comprises an isolation layer 5 mounted between the protective layer 4 and the surface layer 6.

The isolation layer 5 is preferably made of an oxide material, such as an indium and tin oxide (ITO) or the like, that can prevent an electromagnetic interference (EMI) efficiently so as to enhance the signal transmission effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A cladding structure, comprising a plurality of serial buses, an insulating covering layer surrounding the serial buses, a metallic plating layer mounted on the covering layer, and a metallic protective layer mounted on the plating layer, wherein:

each of the serial buses includes a co-axial cable;

the covering layer surrounds an outer side of the serial buses to form an insulating layer to protect the serial buses;

the plating layer is attached on a surface of the covering layer;

the protective layer is attached on a surface of the plating layer;

the cladding structure further comprises an isolation layer mounted on a surface of the protective layer, wherein the isolation layer is made of an indium and tin oxide (ITO) to prevent an electromagnetic interference (EMI).

2. The cladding structure in accordance with claim 1, wherein the serial buses are equally spaced from each other.

3. The cladding structure in accordance with claim 1, wherein the covering layer is made of Mylar.

4. The cladding structure in accordance with claim 1, wherein the covering layer is made of PVC.

5. The cladding structure in accordance with claim 1, wherein the covering layer is made of PU.

6. The cladding structure in accordance with claim 1, wherein the covering layer is made of a heat-resistant material.

7. The cladding structure in accordance with claim 1, wherein the plating layer is made of a copper to prevent an electromagnetic interference.

8. The cladding structure in accordance with claim 1, wherein the plating layer is attached on the surface of the covering layer in a sputter plating manner.

9. The cladding structure in accordance with claim 1, wherein the plating layer forms an electromagnetic interference isolation layer on the surface of the covering layer to prevent an electromagnetic interference.

10. The cladding structure in accordance with claim 1, wherein the protective layer is made of a wear-resistant and anti-oxidant metallic material.

11. The cladding structure in accordance with claim 1, wherein the protective layer is made of a stainless steel.

12. The cladding structure in accordance with claim 1, wherein the protective layer is attached on the surface of the plating layer in a sputter plating manner to enhance the wear-resistant and anti-oxidant strength of the surface of the plating layer.

13. The cladding structure in accordance with claim 1, further comprising an insulating surface layer mounted on a surface of the isolation layer.

14. The cladding structure in accordance with claim 13, wherein the surface layer is made of a rubber surrounding the surface of the isolation layer.

15. The cladding structure in accordance with claim 1, further comprising an insulating surface layer mounted on a surface of the protective layer.

16. The cladding structure in accordance with claim 15, wherein the surface layer is made of a rubber surrounding the surface of the protective layer.

* * * * *